US007941628B2

(12) United States Patent
Kalos et al.

(10) Patent No.: US 7,941,628 B2
(45) Date of Patent: May 10, 2011

(54) ALLOCATION OF HETEROGENEOUS STORAGE DEVICES TO SPARES AND STORAGE ARRAYS (75) Inventors: Matthew Joseph Kalos, Tucson, AZ (US); Robert Akira Kubo, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 11/849,888

(22) Filed: Sep. 4, 2007

(65) Prior Publication Data
US 2009/0063768 A1 Mar. 5, 2009

(51) Int. Cl.
*G06F 12/00* (2006.01)
*G06F 11/00* (2006.01)
(52) U.S. Cl. ........ 711/170; 711/112; 711/114; 711/162; 714/1; 714/2; 714/5; 714/6; 714/7
(58) Field of Classification Search .................. 711/112, 711/114, 162, 170; 714/1, 2, 5, 6, 7
See application file for complete search history.

(56) References Cited

U.S. PATENT DOCUMENTS

| 5,430,855 | A  | * | 7/1995  | Walsh et al. ........... 710/10 |
| 5,651,133 | A  |   | 7/1997  | Burkes et al. |
| 6,598,174 | B1 | * | 7/2003  | Parks et al. ............ 714/6 |
| 7,146,522 | B1 | * | 12/2006 | Rowe et al. ............ 714/6 |
| 7,313,721 | B2 |   | 12/2007 | Ashmore ............... 714/7 |
| 7,363,532 | B2 | * | 4/2008  | Ali et al. .............. 714/6 |
| 7,418,623 | B2 | * | 8/2008  | Elliott et al. ........... 714/7 |
| 7,434,090 | B2 | * | 10/2008 | Hartung et al. .......... 714/6 |
| 7,434,097 | B2 | * | 10/2008 | Guha et al. ............. 714/7 |
| 7,502,955 | B2 | * | 3/2009  | Ishikawa et al. ......... 714/6 |
| 7,533,292 | B2 | * | 5/2009  | Van Gundy et al. ....... 714/7 |
| 7,536,527 | B2 | * | 5/2009  | Watanabe ............. 711/165 |

(Continued)

OTHER PUBLICATIONS

IBM, "RAID Storage System Hierarchical Global Sparing Architecture using Spare Pools to Enable DDM Class Intermix (i.e. FC-AL, STAT, SAS) within a Storage System", IP.com , Nov. 11, 2004, pp. 1-3.
IBM, "Spare Management in Data Storage System", IP.com, Sep. 25, 2006, pp. 1-5.

(Continued)

*Primary Examiner* — Kevin L Ellis
*Assistant Examiner* — Mehdi Namazi
(74) *Attorney, Agent, or Firm* — Rabindranath Dutta; Konrad Raynes & Victor LLP (57) ABSTRACT

A plurality of storage devices of a plurality of types is provided. A plurality of criteria is associated for each of the plurality of storage devices, based on characteristics of the plurality of storage devices, wherein the plurality of criteria can be used to determine whether a selected storage device is a compatibility spare for a storage device in a storage device array, and whether the selected storage device is an availability spare for the storage device in the storage device array. A determination is made by a spare management application, based on at least the plurality of criteria and at least one optimality condition, of a first set of storage devices selected from the plurality of storage devices to be allocated to a plurality of storage device arrays, and of a second set of storage devices selected from the plurality of storage devices to be allocated as spares for the plurality of storage device arrays. An allocation is made of the first set of storage devices to the plurality of storage device arrays. An allocation made of the second set of storage devices as spares for the plurality of storage device array.

20 Claims, 8 Drawing Sheets

U.S. PATENT DOCUMENTS

| | | |
|---|---|---|
| 7,536,586 B2 * | 5/2009 | Ahmadian et al. .............. 714/6 |
| 7,664,913 B2 * | 2/2010 | Cassell et al. ................ 711/114 |
| 2002/0152416 A1 | 10/2002 | Fukuda |
| 2003/0221057 A1 | 11/2003 | Smith et al. |
| 2004/0260967 A1 * | 12/2004 | Guha et al. ..................... 714/3 |
| 2005/0114593 A1 | 5/2005 | Cassell et al. |
| 2006/0015771 A1 | 1/2006 | Van Gundy et al. |
| 2006/0075283 A1 * | 4/2006 | Hartung et al. .................. 714/5 |
| 2006/0161823 A1 | 7/2006 | Sato |
| 2008/0168225 A1 * | 7/2008 | O'Connor .................... 711/114 |

OTHER PUBLICATIONS

IBM, "Temporary RAID System Sparing to Low Cost Devices", IP.com, Nov. 11, 2004, pp. 1-5.

Memon et al., "Comparison of Sparing Alternatives for Disk Arrays", ACM, 1992, pp. 318-329.

Lee et al., "Double Parity Sparing for Improvement of Performance and Reliability in Disk Arrays", IEEE, 1996, pp. 345-348.

Brown et al., "Towards Availability Benchmarks: A Case Study of Software RAID Systems", USENIX Association, 2000, pp. 1-15.

* cited by examiner

ALLOCATION OF HETEROGENEOUS STORAGE DEVICES TO SPARES AND STORAGE ARRAYS

BACKGROUND

1. Field

The disclosure relates to a method, system, and article of manufacture for the allocation of heterogeneous storage devices to spares and storage arrays.

2. Background

Certain information technology storage systems may provide high availability and reliability via implementations that provide redundancy. Fault tolerance may be achieved in such storage systems via redundant fault tolerant hardware designs in which user data may be stored in arrays of storage devices, such as disk drives, configured in a Redundant Arrays of Inexpensive Disks (RAID) scheme.

To maintain availability of RAID arrays, spare disk drives, referred to as spares, may be allocated. The spares may dynamically replace failing disks in the RAID arrays, thereby restoring the redundancy of RAID arrays in the event of failures. Certain allocation algorithms allocate some number of spares per disk type to make sure that all RAID arrays have available spares.

SUMMARY OF THE PREFERRED EMBODIMENTS

Provided are a method, system, and article of manufacture, wherein a plurality of storage devices of a plurality of types are provided. A plurality of criteria is associated for each of the plurality of storage devices, based on characteristics of the plurality of storage devices, wherein the plurality of criteria can be used to determine whether a selected storage device is a compatibility spare for a storage device in a storage device array, and whether the selected storage device is an availability spare for the storage device in the storage device array. A determination is made by a spare management application, based on at least the plurality of criteria and at least one optimality condition, of a first set of storage devices selected from the plurality of storage devices to be allocated to a plurality of storage device arrays, and of a second set of storage devices selected from the plurality of storage devices to be allocated as spares for the plurality of storage device arrays. An allocation is made of the first set of storage devices to the plurality of storage device arrays. An allocation is also made of the second set of storage devices as spares for the plurality of storage device arrays.

In certain embodiments, the use of the optimality condition by the spare management application allows the spares to be fewer in number in comparison to no optimality condition being used by the spare management application, and wherein the optimality condition is based at least on importance provided to selected criteria of the plurality of criteria.

In further embodiments, the plurality of criteria corresponding to a first storage device comprise: (i) a storage capacity of the first storage device, wherein any spare for the first storage device has storage capacity equal to or greater than the storage capacity of the first storage device; (ii) a rotational speed of the first storage device; and (iii) a storage class of the first storage device.

In yet further embodiments, a selected compatibility spare for a first storage device has characteristics that are equal to or better than the characteristics included in all of the plurality of criteria of the first storage device.

In still further embodiments, a selected availability spare for a first storage device has characteristics that are equal to or better than mandatory characteristics included in at least some of plurality of criteria of the first storage device, wherein the mandatory characteristics include a storage capacity for a corresponding device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Allocation algorithms that allocate some number of spares per disk type to make sure that all RAID arrays have available spares may allocate an excessive number of spares when there are multiple types of disks. Certain embodiments, allocate spares such that when there are many different types of disks, the number of spares are reduced by allowing the sharing of spares of one disk type among a plurality of disk types that are present in disk arrays.

Certain embodiments provide for a compatibility spare, wherein compatibility spare is any spare with a disk type that has characteristics that are equivalent or in excess of the sparing requirements for a particular disk type. For example, in an exemplary embodiment the characteristics of interest may be capacity and speed. A spare that has a capacity greater than or equal to disk type X and a speed greater than or equal to disk type X is a suitable compatibility spare because if the spare is used in a RAID array with disk type X, the spare will not degrade the RAID array in any way.

Certain embodiments provide for availability spares. An availability spare is any spare with a disk type that has a set of characteristics that are equivalent to or in excess of the sparing requirements for a particular disk type, but other characteristics that are sub-standard for the sparing requirements of a particular disk type. The set of characteristics that are equivalent or are in excess are deemed mandatory to allow for sparing to occur, while the set of characteristics that are sub-standard are deemed tolerable for some period of time until a repair of the RAID array can be made. For example, in an exemplary embodiment the characteristics of interest may be capacity and speed. A spare must have a capacity greater than or equal to the RAID array that uses the spare, but can tolerate a lower speed.

Certain embodiments reduces, optimizes, and/or minimizes the number of spares allocated based on criteria specified for a number of required compatibility and availability spares for each disk type installed. Certain embodiments allow spares allocated for one disk type to be shared between a plurality of disk types, such that fewer spares are required to provide a sufficient spare allocation for a set of different drive types. Certain exemplary embodiments may be implemented by using N dimensional matrixes where each characteristic is one of the dimensions and each element in the matrix (e.g., $a_{ijk}$ is associated with a disk type with characteristics i, j, and k). Certain embodiments generate an output that corresponds to the number of required spares (and deferred spares) for each disk type to meet certain criteria.

Exemplary Embodiments

Figure 1:
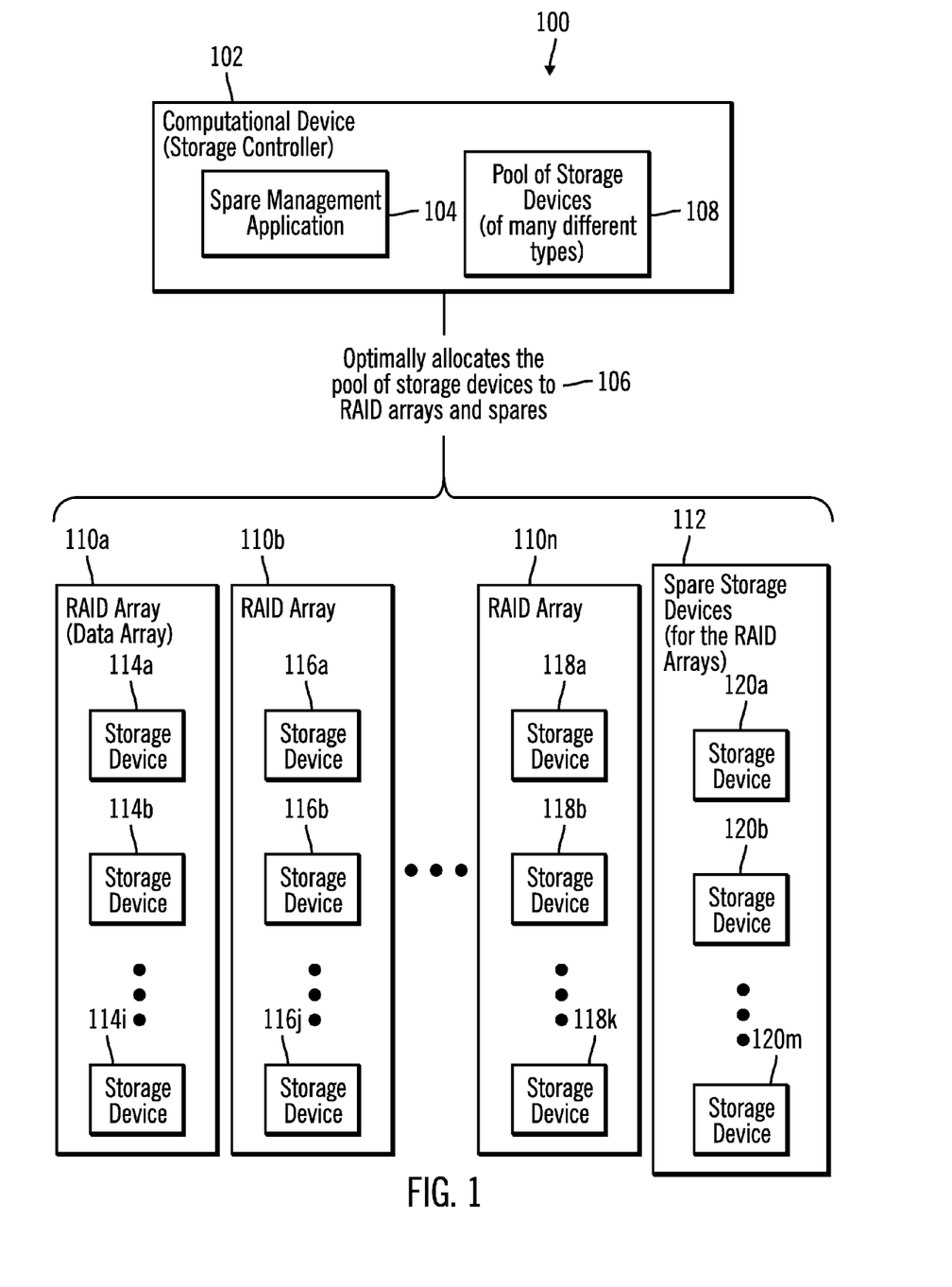
FIG. 1 illustrates a block diagram of a computing environment, in accordance with certain embodiments.

FIG. 1 illustrates a block diagram of a computing environment 100, in accordance with certain embodiments. In the computing environment 100, a computational device 102, such as a storage controller, includes a spare management application 104 that optimally allocates 106 a pool of storage devices 108 of many different types among a plurality of data arrays 110a, 110b, . . . 110n, such as RAID arrays, and generates a plurality of spares 112 for the storage devices 114a, 114b, . . . , 114i, 116a, 116b, . . . , 116j, 118a, 118b, . . . , 118k included in RAID arrays 110a . . . 110n. For example, in FIG. 1 the storage devices 120a, 120b, . . . , 120m provide spares for the RAID arrays 110a . . . 110n.

While in FIG. 1, the computational device 102 has been shown to be a storage controller, in alternative embodiments, the computational device 102 may comprise any suitable computational device, such as a personal computer, a server, a workstation, a mainframe computer, etc. The storage devices shown in FIG. 1 may comprise any suitable storage device, such as, disk drives, optical drives, etc.

The pool of storage devices 108 shown within the computational device 102 may be implemented as a data structure that represents storage devices to be allocated among the RAID arrays 110a . . . 110n and the spares 112.

Figure 2:
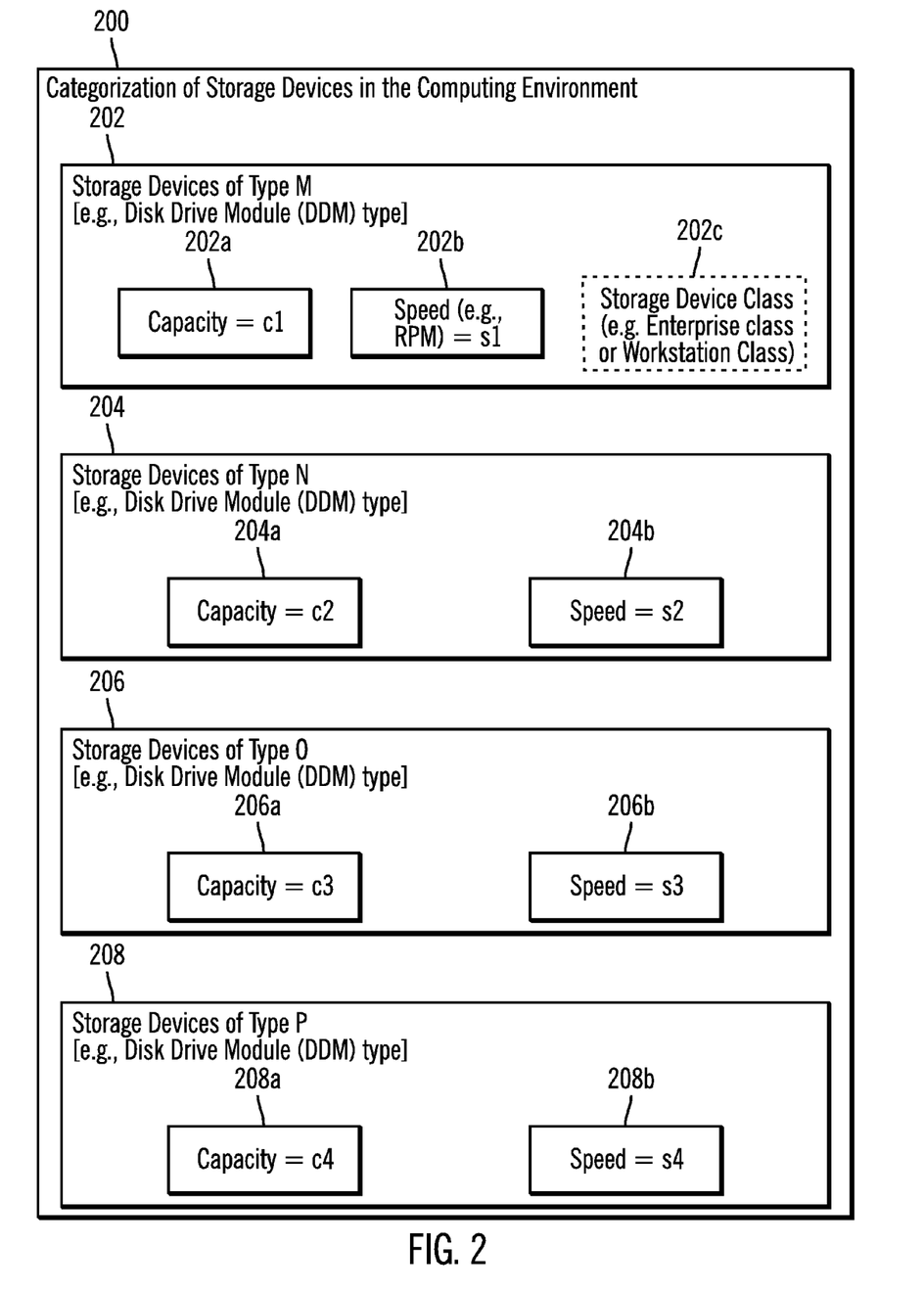
FIG. 2 illustrates a categorization of storage devices in the computing environment, in accordance with certain embodiments.

FIG. 2 illustrates an exemplary categorization 200 of the pool of storage devices 108 in the computing environment 100, in accordance with certain embodiments. There may be four different types of exemplary storage devices, storage devices of type M 202, type N 204, type O 206, type P 208. The storage capacities 202a, 204a, 206a, 208a and the speed 202b, 204b, 206b, 208b of the different storage device types 202, 204, 206, 208 are shown in FIG. 2, wherein the storage capacities 202a, 204a, 206a, 208a may be measured in megabytes, gigabytes or some other unit, and the speed 202b, 204b, 206b, 208b may be measured in rotations per minute (RPM). The pool of storage devices 108 may have a plurality of storage devices of such exemplary device types 202, 204, 206, 208 as shown in FIG. 2. Other characteristics of the device types such as storage device class 202c may also be used in certain embodiments. For example, the storage device class 202c may be an enterprise class or a workstation class in certain embodiments. While FIG. 2 shows the storage device class 202c associated with only storage devices of type M 202, storage device classes may also be associated with some or all of the other types of storage devices, such as, storage devices of type N 204, storage devices of type O 206, and storage devices of type P 208. In certain embodiments an exemplary type of storage device may be associated with a unique combination of speed, storage capacity and class, whereas in other embodiments an exemplary type of storage device may be associated with a unique combination of speed and storage capacity only. For example, in certain exemplary embodiments, a first type of storage device may be associated with a first storage capacity and a first speed and a second type of storage device may be associated with a second storage capacity and a second speed, wherein at least one of the characteristics (i.e., storage capacity or speed) differs between the first type of storage device and the second type of storage device. Exemplary types of storage devices may be associated with different characteristics than those shown in FIG. 2.

Figure 3:
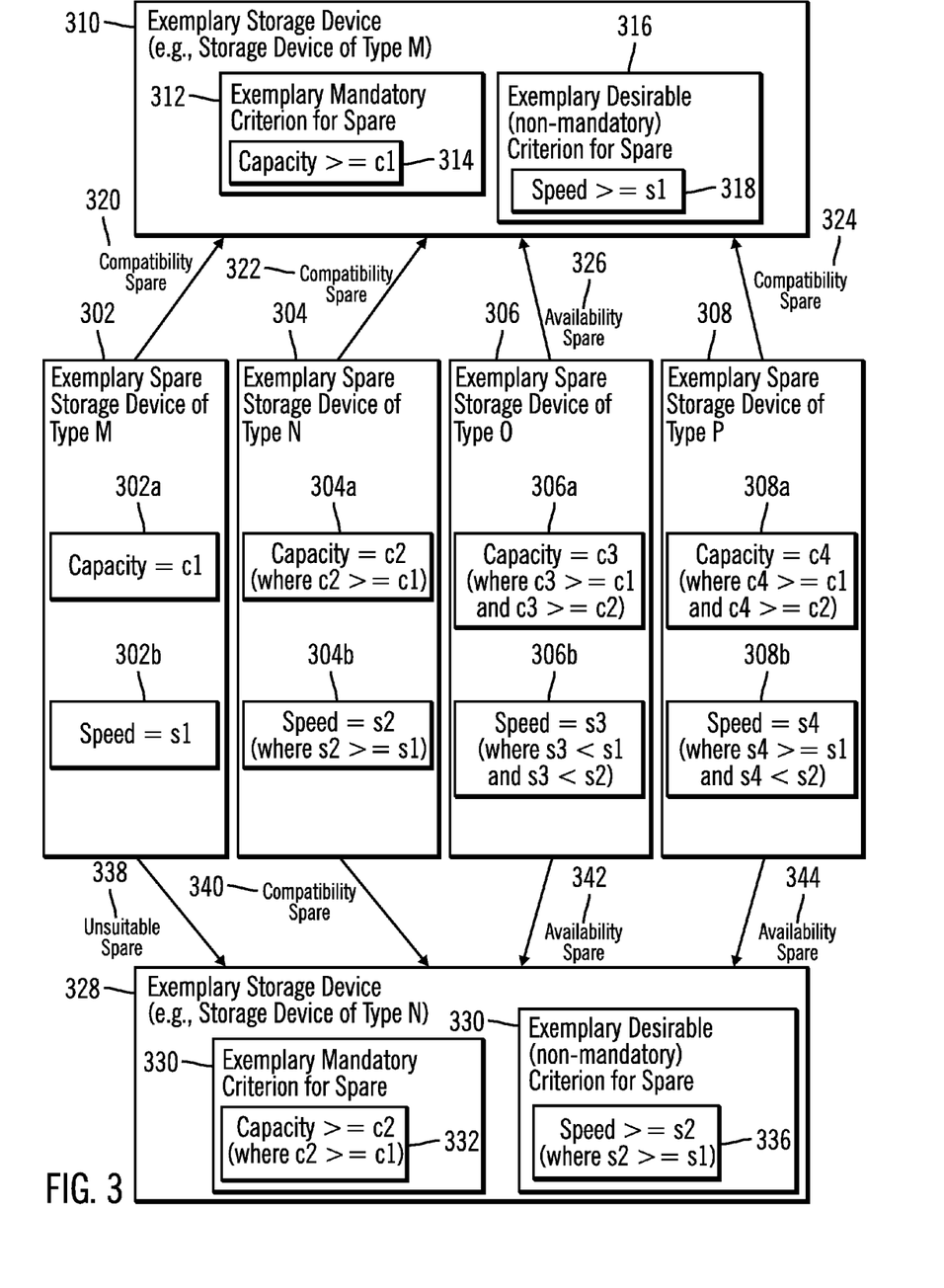
FIG. 3 illustrates compatibility spares and availability spares in the computing environment, in accordance with certain embodiments.

FIG. 3 illustrates compatibility spares and availability spares in the computing environment 100, in accordance with certain embodiments. A set of four exemplary storage devices 302, 304, 306, 308 are shown in FIG. 3, wherein the storage device 302 is of type M 202, wherein the storage device 304 is of type N 204, wherein the storage device 306 is of type O 206, wherein the storage device 308 is of type P 208. The storage devices 302, 304, 306, 308 have capacities 302a, 304a, 306a, 308a and speed 302b, 304b, 306b, 308b, wherein certain relationships among the capacities and speeds are shown in FIG. 3.

An exemplary storage device 310 of type M 202 is also shown in FIG. 3, wherein the exemplary storage device 310 is to be replaced by a spare selected from the spare storage devices 302, 304, 306, 308. In certain embodiments a spare has to satisfy certain mandatory criterion 312 such as capacity characteristics 314, where it may merely be desirable but not mandatory to satisfy non-mandatory criterion 316 such as speed characteristics 318.

In FIG. 3 the spare storage devices 302, 304, 308 are all compatibility spares 320, 322, 324 for the storage device if type M 310. For example, the capacity 304a and speed 304b of the spare storage device 304 are better than or equal to the conditions of the mandatory criterion 312 and the non-mandatory criterion 314, and therefore the storage device 304 is a compatibility spare for storage device 310. However, spare storage device 306 is an availability spare 326 for storage device 310 because while the mandatory criterion 312 corresponding to capacity 314 is satisfied, the speed 306b (indicated as s3 in FIG. 3) of the spare storage device 306 is less than the speed 318 (indicated as s1 in FIG. 3) which is a non-mandatory criterion 316 of the storage device 310.

An exemplary storage device 328 of type N 204 is also shown in FIG. 3, wherein the exemplary storage device 328 is to be replaced by a spare selected from the spare storage devices 302, 304, 306, 308. In certain embodiments a spare has to satisfy certain mandatory criterion 330 such as capacity characteristics 332, where it may merely be desirable but not mandatory to satisfy non-mandatory criterion 334 such as speed characteristics 336. For each of the spare storage devices 302, 304, 306, 308, FIG. 3 indicates whether the spare storage device is a compatibility spare 304, an availability spare 342, 344 or an unsuitable spare 338 for the storage device 328, wherein an unsuitable spare cannot be used to replace the storage device in the event of a failure.

Therefore, FIG. 3 shows how an exemplary spare of a single type may be used to replace storage device 310, 328 of different types. For example, spare storage device 308 of type P 208 can act as a spare both for storage device 310 of type M 202 and storage device 328 of type N 204. A spare of a single type can thus be shared among storage devices of a plurality of types based on the usage of compatibility spares and availability spares.

Figure 4:
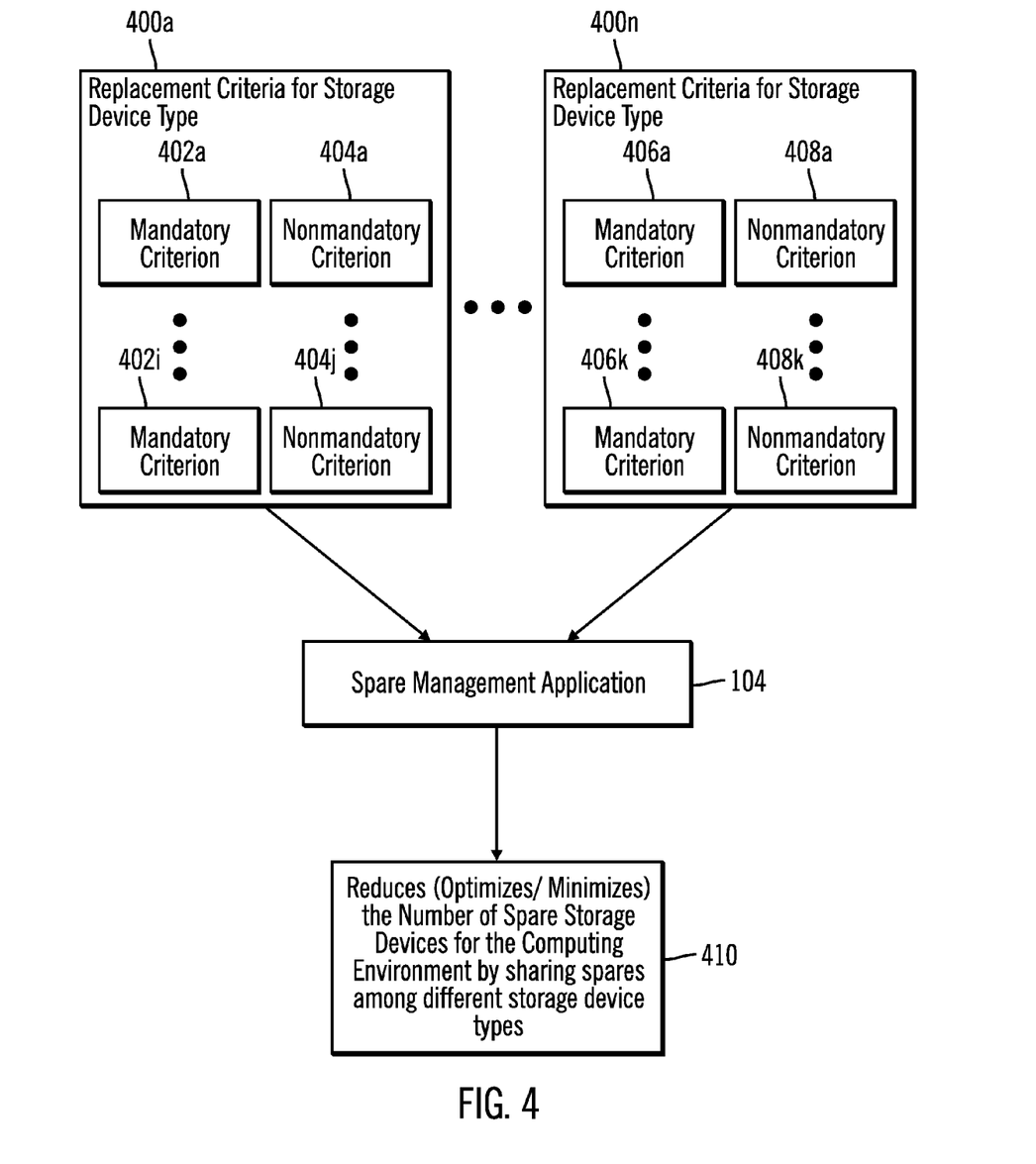
FIG. 4 illustrates allocation of spares by a spare management application in the computing environment, in accordance with certain embodiments.

FIG. 4 illustrates allocation of spares by a spare management application 104 in the computing environment 100, in accordance with certain embodiments. The spare management application 104, implemented in hardware, software, firmware or any combination thereof, takes as input a plurality of replacement criteria 400a . . . 400n for storage device types, wherein the replacement criteria 400a . . . 400n may include mandatory criteria 402a . . . 402i, 406a . . . 406k and non-mandatory criteria 404a . . . 404j, 408a . . . 408k. Based on the provided input, the spare management application 104 reduces, optimizes, and/or minimizes the number of spare storage devices 112 for the computing environment 100 by sharing spares 112 among different storage device types included in the RAID arrays 110a . . . 110n.

Figure 5:
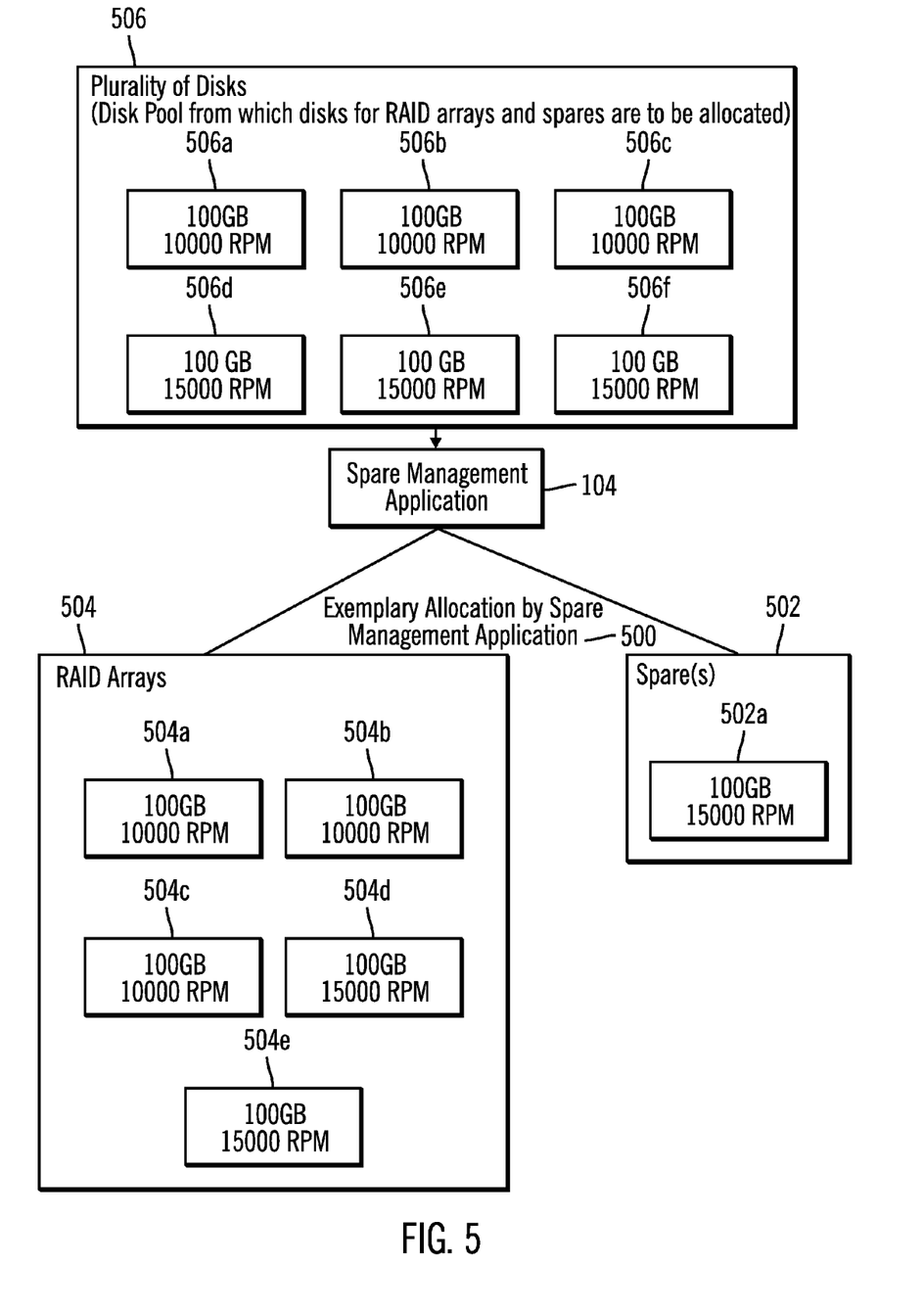
FIG. 5 illustrates a first exemplary allocation of spares and RAID arrays from a plurality of disks in the computing environment, in accordance with certain embodiments.

FIG. 5 illustrates a first exemplary allocation 500 of spares 502 and RAID arrays 504 from a plurality of disks 506 performed by the spare management application 104 in the computing environment 100, in accordance with certain embodiments. The plurality of disks 506 of the storage device pool 108 comprises three 100 GB, 10000 RPM disks 506a, 506b, 506c and three 100 GB, 15000 RPM disks 506d, 506e, 506f. An exemplary allocation 500 may place five of the disks in the RAID arrays 504 (the disks are shown via reference numerals 504a, 504b, 504c, 504d, 504e) and use a single 100 GB, 15000 RPM disk (indicated via reference numeral 502a) as spare. Thus instead of maintaining spares of two different types, a single type of spare may be shared among the RAID arrays 504. In the example shown in FIG. 5, the spare disk 502a is compatibility spare for both types of disks in the RAID array.

Figure 6:
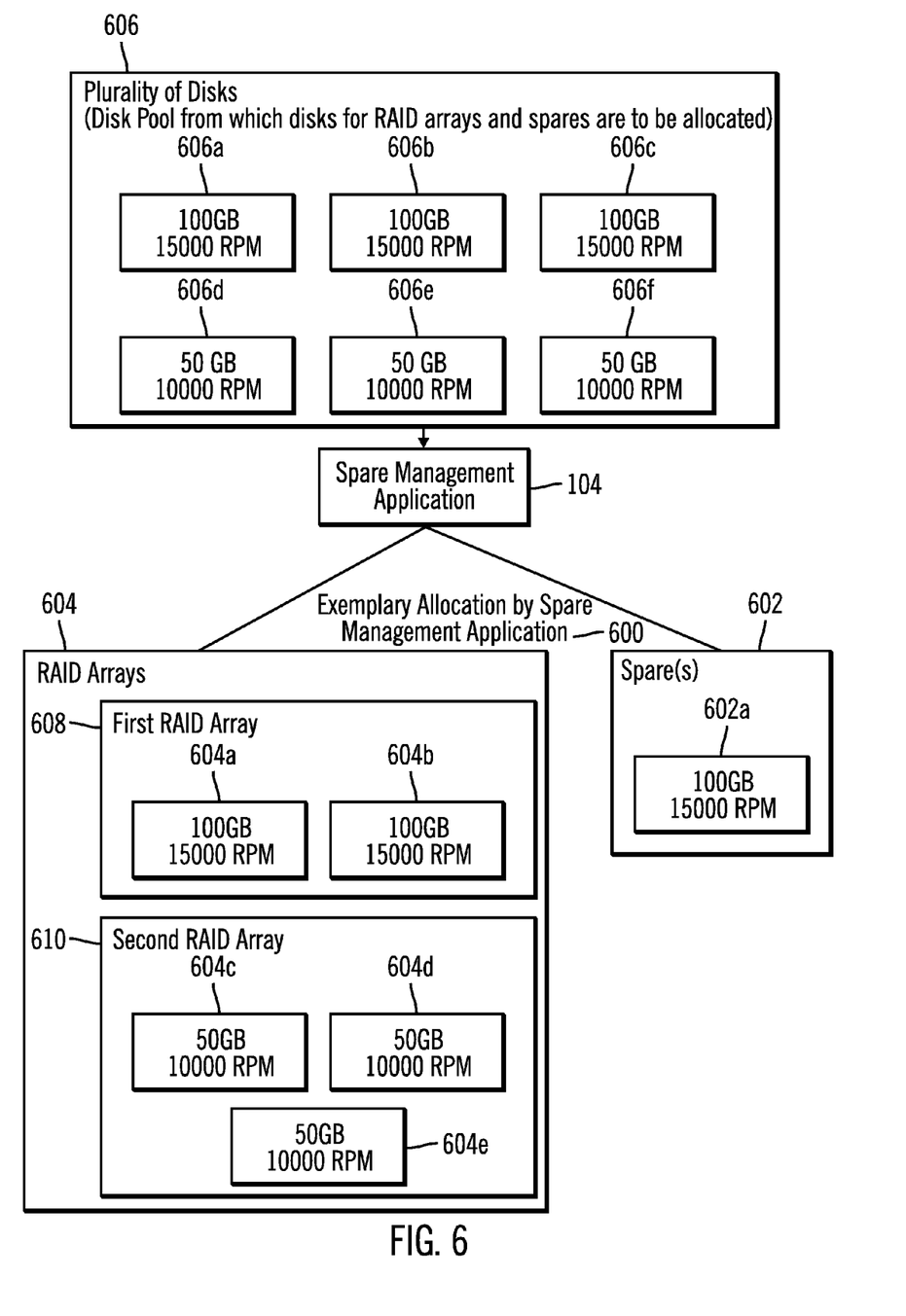
FIG. 6 illustrates a second exemplary allocation of spares and RAID arrays from a plurality of disks in the computing environment, in accordance with certain embodiments.

FIG. 6 illustrates a second exemplary allocation 600 of spares 602 and RAID arrays 604 (it should be noted that RAID arrays 604 may include a plurality of different RAID arrays, e.g., two RAID arrays) from a plurality of disks 606 performed by the spare management application 104 in the computing environment 100, in accordance with certain embodiments. The plurality of disks 606 of the storage device pool 108 comprises three 100 GB, 15000 RPM disks 606a, 606b, 606c and three 50 GB, 10000 RPM disks 606d, 606e, 606f. An exemplary allocation 600 may place five of the disks in the RAID arrays 604 among different RAID arrays (the disks are shown via reference numerals 604a, 604b, 604c, 604d, 604e) and use a single 100 GB, 15000 RPM disk (indicated via reference numeral 602a) as spare such that the performance criteria is optimized. In the RAID arrays 604 shown in FIG. 6, the disks 604a, 604b may form a first RAID array 608 and disks 604c, 604d, 604e may form a second RAID array 610. At least two different disk drive module (DDM) types are used to create different RAID arrays such that the capacity of each disk type is fully utilized in each array. Thus instead of maintaining spares of two different types, a single type of spare may be shared among the RAID arrays 604. In the example shown in FIG. 6, the spare disk 602a is compatibility spare for disks 604a, 604b of the first RAID array 608 and is also a compatibility spare for disks 604c, 604d, 604e in the second RAID array 610.

Figure 7:
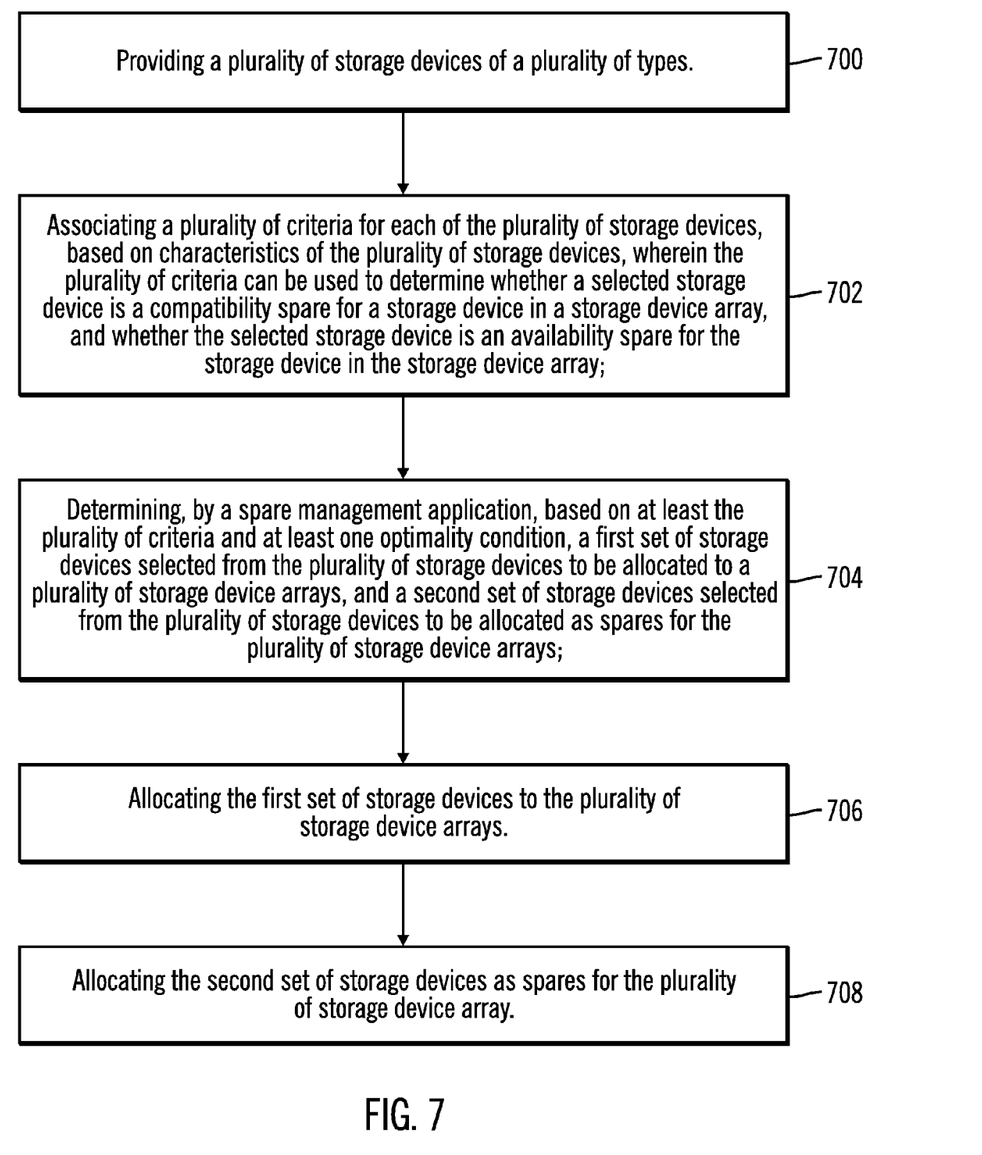
FIG. 7 illustrates operations implemented in the computing environment, in accordance with certain embodiments.

FIG. 7 illustrates operations implemented in the computing environment 100, in accordance with certain embodiments. Certain of the operations may be implemented by the spare management application 104 implemented in the computational device 102.

Control starts at block 700, where a plurality of storage devices 108 of a plurality of types 202, 204, 206, 208 are provided. Control proceeds to block 702, where a plurality of criteria 400a . . . 400n is associated for each of the plurality of storage devices, based on characteristics (e.g., storage capacity, speed, class, etc.) of the plurality of storage devices 108. The plurality of criteria 400a . . . 400n can be used to determine whether a selected storage device is a compatibility spare for a storage device in a storage device array, and whether the selected storage device is an availability spare for the storage device in the storage device array.

The spare management application 104 determines (at block 704), based on at least the plurality of criteria 400a . . . 400n and at least one optimality condition, a first set of storage devices selected from the plurality of storage devices to be allocated to a plurality of storage device arrays, and a second set of storage devices selected from the plurality of storage devices to be allocated as spares for the plurality of storage device arrays. For example, optimality conditions may attempt to minimize or reduce the number of spare devices by sharing storage device of one type among many types of storage devices. The optimality condition may be defined by the user or may be fixed as part of the certain embodiments. The optimality conditions may cause a reduced number of storage devices to be used as spares. The use of the optimality condition by the spare management application 104 allows the spares to be fewer in number in comparison to no optimality condition being used by the spare management application, and wherein the optimality condition is based at least on importance provided to selected criteria of the plurality of criteria. For example, the satisfaction of mandatory criteria may have greater importance than satisfaction of non-mandatory criteria.

The spare management application 104 allocates (at block 706) the first set of storage devices to the plurality of storage device arrays. The spare management application allocates (at block 708) the second set of storage devices as spares for the plurality of storage device array.

Certain embodiments allocate spares such that a spare storage device of one type can be used to replace storage devices of different types in a plurality of RAID arrays that share the spares.

In certain embodiments, a method, system, and article of manufacture, and a method for deploying computer infrastructure may be implemented, wherein the set of selected compatibility spares and availability spares may be optimized by ensuring that the following conditions are satisfied:
(i) limiting the number of spares of any given disk type to 1 per N disks;
(ii) ensuring that all disk types have J compatibility spares and K availability spares, subject to condition (i) being satisfied;
(iii) minimizing the number for spares allocated, by allocating spares first to the disk types that have the greatest potential of being compatibility or availability spares for other disk types; and
(iv) allowing J or K to be selected such that there are more spares allocated than required to meet availability criteria, thereby allowing deferral of repair actions till the number of required spares is exceeded and as a result reducing service costs.

Additional Exemplary Embodiments

In certain embodiments a desired spare configuration is determined by a specific spare allocation algorithm implemented in certain embodiments by the spare management application 104. The set of Disk Drive Modules (DDM) that a spare allocation algorithm is applied to is called the spare domain. The spare domain may correspond to the set of devices that when configured into RAID arrays are allowed to share a set of spares. It is model dependent as to whether a spare allocation algorithm implemented in certain embodiments by the spare management application 104 is user specified and whether the spare allocation algorithm can be specified independently for each spare domain.

Spares are either required spares or deferred-service spares. The spare type affects whether service is required when a DDM fails. Deferred-service spares may be configured to avoid having to call for service as often, thereby reducing the number of repair actions required.

Certain embodiments attempts to minimize the number of spares required for a set of disk types in a spare domain.

Certain embodiments take advantage of the fact that a spare DDM of a given capacity and RPM is a potential compatibility spare for any failed array member in an array that has a DDM capacity less than or equal to the spare capacity and an array RPM less than or equal to the spare RPM. Such a spare is compatibility spare because it does not degrade the array when sparing occurs and because DDM migration ultimately allows the data on the spare to be migrated back to a replacement DDM of suitable capacity and RPM (i.e. the excess capacity or speed of the spare is only possibly under-utilized during the repair window). A compatibility spare may meet the sparing needs of one or more disk types as opposed to allocating a spare for each disk type.

Certain embodiments also take advantage of the fact that a spare DDM of a given capacity is a potential availability spare for any failed array member in an array that has an array DDM capacity less than or equal to the spare capacity even though the spare may have a slower RPM than the array DDM RPM. Such a spare is considered availability spare because, although it may degrade the array's performance during the repair window, it at least may avoid loss of access to an array due to failure of too many array members. The number of compatibility spares allocated may be reduced if it is acceptable that some array degradation may occur during a subset of a repair window when all compatibility spares are exhausted and availability spares are used (i.e. either the performance degradation is tolerable for the period of a repair action or there are sufficient compatibility spares that the probability of not having a compatibility spare when needed does not warrant configuring additional compatibility spares given that the loss of access is covered by the availability spare).

Certain terms with corresponding symbols denoting the terms are as used for certain embodiments are described below:

1) Required Compatibility Spares ($R_C$): The number of required compatibility spares that are desired for any given disk type in the spare domain;
2) Deferred-Service Compatibility Spares ($D_C$): The number of deferred-service compatibility spares that are desired for any given disk type in the spare domain;
3) Required Availability Spares ($R_A$): The number of required availability spares that are desired for any given disk type in the spare domain;
4) Deferred-Service Availability Spares ($D_A$): The number of deferred-service availability spares that are desired for any given disk type in the spare domain;
5) Interval (I): The number of DDMs per spare (e.g. Interval=N means that at most one spare is allocated within each full or partial group of N DDMs of the same disk type in the spare domain);
6) Spares per Class (boolean): If true, each disk class is assigned its own independent set of compatibility and availability spares (i.e. separate N, P, R, D matrices for each disk class).

If the input parameters specify R required spares and D deferred service spares of a given type (compatibility or availability) and there are r required spares and d deferred-service spares of a given type allocated, then criteria for the number of spares is satisfied if r>=R and r+d>=R+D. In other words, any excess required spares may be considered as satisfying the deferred spare requirement. This criteria is applied independently for compatibility spares and availability spares such that the same allocated spare may satisfy the requirements of both a compatibility and availability spare.

Certain embodiments are implemented as follows as per the spare allocation algorithm:

a) Within the set of supported disk types, there are J unique disk capacities and K unique disk RPMs. All DDMs in the spare domain are separated into groups of the same disk type (capacity, RPM). A given group is designated by ($c_j$, $r_k$) where $c_1$ is the largest capacity, $c_J$ is the smallest capacity, $r_1$ is the fast RPM, and $r_K$ is the slowest RPM. This sorts the disk type groups by capacity first, and then by RPM within each capacity.

b) Form the DDM count matrix N(J×K) where the element $n_{jk}$ is the number of DDMs in the disk type group ($c_j$, $r_k$).

c) Form the interval matrix P(J×K) where the element $p_{jk}$ is the number of full or partial intervals within each disk group and is calculated as: $p_{jk}$=INT(($n_{jk}$+I−1)/I)). The value for each disk type indicates the maximum number of spares that can be configured for that disk type.

d) Initialize the required spare R(J×K) and deferred-service spare D(J×K) matrices to 0 (i.e. $r_{jk}$=0, $d_{jk}$=0). These matrices will be used to indicate the number of required spares and deferred-service spares to be configured for each disk type group.

e) Allocate up to $R_C$ required spares for each disk type in the spare domain, by indicating in the required spare matrix R, at a rate of one per interval or partial interval within each disk group, considering any already allocated required spares, in the order of largest, then fastest, disk type group first. Processing by row (capacity) first and column (RPM) second, for each element of the required spare matrix R, perform the following calculation: Residual=Max(0, $R_C$−Sum$_{lm}$($r_{lm}$)) $r_{jk}$=Min (Residual, $p_{jk}$), where the sum is over the sub-matrix of R with l<=j, and m<=k (i.e. over all compatibility disk types which is the sub-matrix with corners at $r_{11}$ and $r_{jk}$).

f) Allocate up to $R_A$ required spares for each disk type in the spare domain, by indicating in the required spare matrix R, at a rate of one per interval or partial interval within each disk group, considering any already allocated required spares, in the order of largest, then fastest, disk type group first. Processing by row (capacity) first and column (RPM) second, for each element of the required spare matrix R, perform the following calculation: Residual=Max(0, $R_A$−Sum$_{lm}$($r_{lm}$)) $r_{jk}$=$r_{jk}$+Min(Residual, $p_{jk}$−$r_{jk}$), Where the sum is over the elements of R with l<=j and with m<=K (i.e. over all availability disk types which is the sub-matrix of all rows from 1 to j.

g) Allocate up to $D_C$ deferred-service spares for each disk type in the spare domain, by indicating in the deferred-service spare matrix D, at a rate of one per interval or partial interval within each disk group, considering any existing spares, in the order of largest, then fastest, disk type group first. Processing by row (capacity) first and column (RPM) second, for each element of the deferred-service spare matrix D, perform the following calculation: Residual=Max(0, $R_C$+$D_C$−Sum$_{lm}$ ($r_{lm}$+$d_{lm}$); $d_{jk}$=Min(Residual, $p_{jk}$−$r_{jk}$), where the sum is over the sub-matrixes of R and D with l<=i and m<=j (i.e. over all compatibility disk types which are the sub-matrices with corners at $x_{11}$ and $x_{jk}$).

h) Allocate up to $D_A$ deferred-service spares for each disk type in the spare domain, by indicating in the deferred-service spare matrix D, at a rate of one per interval or partial interval within each disk group, considering any existing spares, in the order of largest, then fastest, disk type group first. Processing by row (capacity) first and column (RPM) second, for each element of the deferred-service spare matrix D, perform the following calculation: Residual=Max(0, $R_A+D_A-\text{Sum}_{lm}(r_{lm}+d_{lm})$); $d_{jk}=d_{jk}+\text{Min}(\text{Residual}, p_{jk}-r_{jk}-d_{jk})$; Where the sum is over the elements of R and D $1=<j$ and with $m<=K$ (i.e. over all availability disk types which is the sub-matrix of all rows from l to j).

i) In disk type group ($c_j$, $r_k$), configure $r_{jk}$ required spares and $d_{jk}$ deferred-service spares.

If DDMs are subsequently added to a spare domain after spares are configured with either the spares per type or coverage spare allocation algorithms, the algorithms are processed again against the spare domains. Additional spares may be required due to the addition of the DDMs and some of the existing spares may become unnecessary spares.

Further Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
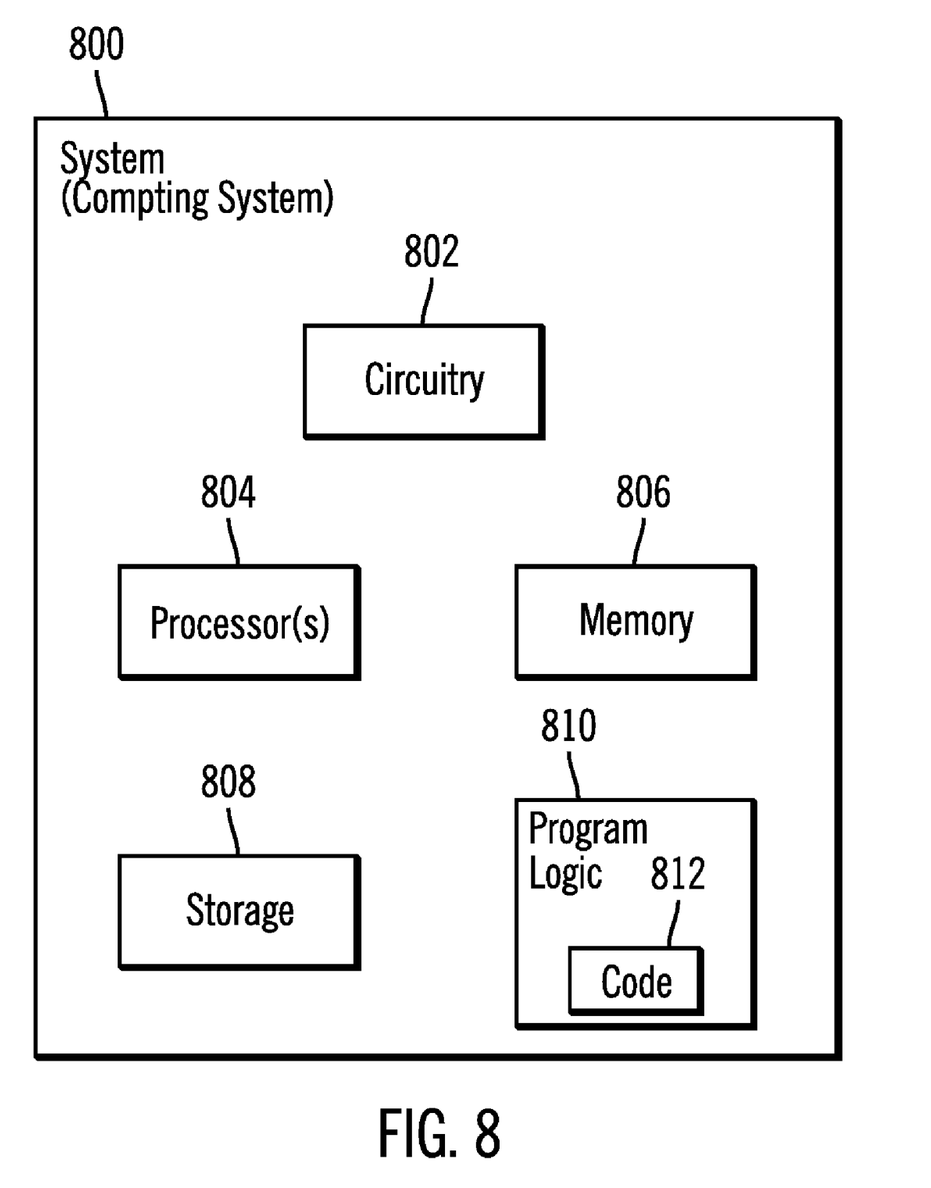
FIG. 8 illustrates a block diagram of a computer architecture in which certain described aspects of the embodiments are implemented.

FIG. 8 illustrates the architecture of computing system 800, wherein in certain embodiments the computational device 102 of the computing environment 100 of FIG. 1 may be implemented in accordance with the architecture of the computing system 800. The computing system 800 may also be referred to as a system, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    providing a plurality of storage devices of a plurality of storage device types;
    associating a plurality of criteria for each of the plurality of storage devices, based on characteristics of the plurality of storage devices, wherein the plurality of criteria can be used to determine whether a selected storage device is a compatibility spare for a storage device in a storage device array, and whether the selected storage device is an availability spare for the storage device in the storage device array;
    determining, by a spare management application, based on at least the plurality of criteria and at least one optimality condition, a first set of storage devices selected from the plurality of storage devices to be allocated to a plurality of storage device arrays, and a second set of storage devices selected from the plurality of storage devices to be allocated as spares for the plurality of storage device arrays;
    allocating the first set of storage devices to the plurality of storage device arrays; and
    allocating the second set of storage devices as spares for the plurality of storage device array, wherein a selected compatibility spare for a first storage device has a storage capacity that is greater than or equal to the first storage device and a rotational speed that is greater than or equal to the first storage device, wherein a selected availability spare for the first storage device has a storage capacity that is greater than or equal to the first storage device, and wherein while allocating the second set of storage devices as spares, satisfying the following conditions:
    ensuring that all storage device types have a first number of compatibility spares and a second number of availability spares, while limiting number of spares of any selected storage device type to one per a third number of storage devices;
    allocating spares first to storage device types that have greatest potential of being compatibility or availability spares for other storage device types; and
    allowing the first number or the second number to be selected such that there are more spares allocated than required to meet availability criteria to allow deferral of repair actions.

2. The method of claim 1, wherein use of the optimality condition by the spare management application allows the spares to be fewer in number in comparison to no optimality condition being used by the spare management application, and wherein the optimality condition is based at least on importance provided to selected criteria of the plurality of criteria.

3. The method of claim 1, wherein the plurality of criteria corresponding to a first storage device comprise:
    (i) a storage capacity of the first storage device, wherein any spare for the first storage device has storage capacity equal to or greater than the storage capacity of the first storage device;
    (ii) a rotational speed of the first storage device; and
    (iii) a storage class of the first storage device.

4. The method of claim 1, wherein if input parameters specify R required spares and D deferred service spares of a given type, and there are r required spares and d deferred service spares of the given type allocated, then a criteria for the number of spares is satisfied
if r>=R and (r+d)>=(R+D).

5. The method of claim 4, wherein the given type is compatibility or availability.

6. A system, comprising:
    a plurality of storage devices of a plurality of storage device types;
    memory;
    a processor coupled to the memory, wherein the processor performs operations, the operations comprising:
    (i) associating a plurality of criteria for each of the plurality of storage devices, based on characteristics of the plurality of storage devices, wherein the plurality of criteria can be used to determine whether a selected storage device is a compatibility spare for a storage device in a storage device array, and whether the selected storage device is an availability spare for the storage device in the storage device array;
    (ii) determining, by a spare management application, based on at least the plurality of criteria and at least one optimality condition, a first set of storage devices selected from the plurality of storage devices to be allocated to a plurality of storage device arrays, and a second set of storage devices selected from the plurality of storage devices to be allocated as spares for the plurality of storage device arrays;

(iii) allocating the first set of storage devices to the plurality of storage device arrays; and (iv) allocating the second set of storage devices as spares for the plurality of storage device array, wherein a selected compatibility spare for a first storage device has a storage capacity that is greater than or equal to the first storage device and a rotational speed that is greater than or equal to the first storage device, wherein a selected availability spare for the first storage device has a storage capacity that is greater than or equal to the first storage, and wherein while allocating the second set of storage devices as spares, satisfying the following conditions:

ensuring that all storage device types have a first number of compatibility spares and a second number of availability spares, while limiting number of spares of any selected storage device type to one per a third number of storage devices;

allocating spares first to storage device types that have greatest potential of being compatibility or availability spares for other storage device types; and allowing the first number or the second number to be selected such that there are more spares allocated than required to meet availability criteria to allow deferral of repair actions.

7. The system of claim 6, wherein use of the optimality condition by the spare management application allows the spares to be fewer in number in comparison to no optimality condition being used by the spare management application, and wherein the optimality condition is based at least on importance provided to selected criteria of the plurality of criteria.

8. The system of claim 6, wherein the plurality of criteria corresponding to a first storage device comprise:

(i) a storage capacity of the first storage device, wherein any spare for the first storage device has storage capacity equal to or greater than the storage capacity of the first storage device;

(ii) a rotational speed of the first storage device; and (iii) a storage class of the first storage device.

9. The system of claim 6, wherein if input parameters specify R required spares and D deferred service spares of a given type, and there are r required spares and d deferred service spares of the given type allocated, then a criteria for the number of spares is satisfied
if $r \geq R$ and $(r+d) \geq (R+D)$.

10. The system of claim 9, wherein the given type is compatibility or availability.

11. A computer readable storage medium, wherein code stored in the computer readable storage medium when executed by a processor causes operations, the operations comprising:

providing a plurality of storage devices of a plurality of storage device types;

associating a plurality of criteria for each of the plurality of storage devices, based on characteristics of the plurality of storage devices, wherein the plurality of criteria can be used to determine whether a selected storage device is a compatibility spare for a storage device in a storage device array, and whether the selected storage device is an availability spare for the storage device in the storage device array;

determining, by a spare management application, based on at least the plurality of criteria and at least one optimality condition, a first set of storage devices selected from the plurality of storage devices to be allocated to a plurality of storage device arrays, and a second set of storage devices selected from the plurality of storage devices to be allocated as spares for the plurality of storage device arrays;

allocating the first set of storage devices to the plurality of storage device arrays; and allocating the second set of storage devices as spares for the plurality of storage device array, wherein a selected compatibility spare for a first storage device has a storage capacity that is greater than or equal to the first storage device and a rotational speed that is greater than or equal to the first storage device, wherein a selected availability spare for the first storage device has a storage capacity that is greater than or equal to the first storage device, and wherein while allocating the second set of storage devices as spares, satisfying the following conditions:

ensuring that all storage device types have a first number of compatibility spares and a second number of availability spares, while limiting number of spares of any selected storage device type to one per a third number of storage devices;

allocating spares first to storage device types that have greatest potential of being compatibility or availability spares for other storage device types; and allowing the first number or the second number to be selected such that there are more spares allocated than required to meet availability criteria to allow deferral of repair actions.

12. The computer readable storage medium of claim 11, wherein use of the optimality condition by the spare management application allows the spares to be fewer in number in comparison to no optimality condition being used by the spare management application, and wherein the optimality condition is based at least on importance provided to selected criteria of the plurality of criteria.

13. The computer readable storage medium of claim 11, wherein the plurality of criteria corresponding to a first storage device comprise:

(i) a storage capacity of the first storage device, wherein any spare for the first storage device has storage capacity equal to or greater than the storage capacity of the first storage device;

(ii) a rotational speed of the first storage device; and (iii) a storage class of the first storage device.

14. The computer readable storage medium of claim 11, wherein if input parameters specify R required spares and D deferred service spares of a given type, and there are r required spares and d deferred service spares of the given type allocated, then a criteria for the number of spares is satisfied if $r \geq R$ and $(r+d) \geq (R+D)$.

15. The computer readable storage medium of claim 14, wherein the given type is compatibility or availability.

16. A method for deploying computing infrastructure, comprising integrating computer-readable code into a computer, wherein the code in combination with the computer is capable of performing:

providing a plurality of storage devices of a plurality of storage device types;

associating a plurality of criteria for each of the plurality of storage devices, based on characteristics of the plurality of storage devices, wherein the plurality of criteria can be used to determine whether a selected storage device is a compatibility spare for a storage device in a storage device array, and whether the selected storage device is an availability spare for the storage device in the storage device array;

determining, by a spare management application, based on at least the plurality of criteria and at least one optimality condition, a first set of storage devices selected from the plurality of storage devices to be allocated to a plurality of storage device arrays, and a second set of storage devices selected from the plurality of storage devices to be allocated as spares for the plurality of storage device arrays;

allocating the first set of storage devices to the plurality of storage device arrays; and allocating the second set of storage devices as spares for the plurality of storage device array, wherein a selected compatibility spare for a first storage device has a storage capacity that is greater than or equal to the first storage device and a rotational speed that is greater than or equal to the first storage device, wherein a selected availability spare for the first storage device has a storage capacity that is greater than or equal to the first storage device, and wherein while allocating the second set of storage devices as spares, satisfying the following conditions:

ensuring that all storage device types have a first number of compatibility spares and a second number of availability spares, while limiting number of spares of any selected storage device type to one per a third number of storage devices;

allocating spares first to storage device types that have greatest potential of being compatibility or availability spares for other storage device types; and allowing the first number or the second number to be selected such that there are more spares allocated than required to meet availability criteria to allow deferral of repair actions.

17. The method for deploying computing infrastructure of claim 16, wherein use of the optimality condition by the spare management application allows the spares to be fewer in number in comparison to no optimality condition being used by the spare management application, and wherein the optimality condition is based at least on importance provided to selected criteria of the plurality of criteria.

18. The method for deploying computing infrastructure of claim 16, wherein the plurality of criteria corresponding to a first storage device comprise:
   (i) a storage capacity of the first storage device, wherein any spare for the first storage device has storage capacity equal to or greater than the storage capacity of the first storage device;
   (ii) a rotational speed of the first storage device; and
   (iii) a storage class of the first storage device.

19. The method for deploying computing infrastructure of claim 16, wherein if input parameters specify R required spares and D deferred service spares of a given type, and there are r required spares and d deferred service spares of the given type allocated, then a criteria for the number of spares is satisfied if $r >= R$ and $(r+d) >= (R+D)$.

20. The method for deploying computing infrastructure of claim 19, wherein the given type is compatibility or availability.

* * * * *